Patented June 28, 1927.

1,633,956

UNITED STATES PATENT OFFICE.

CLARENCE J. RODMAN, OF WILKINSBURG, PENNSYLVANIA, ASSIGNOR TO WESTINGHOUSE ELECTRIC & MANUFACTURING COMPANY, A CORPORATION OF PENNSYLVANIA.

MEANS FOR PREVENTING ACIDITY IN OILS.

No Drawing.  Application filed March 12, 1925. Serial No. 15,169.

My invention relates to oil-filled electrical translating devices and especially to means for preventing the deterioration and oxidation of the oil therein.

It is among the objects of my invention to provide means for preventing the formation of acids in the oil of electrical translating devices thereby prolonging the life of usefulness of the insulation therein and of the oil.

Heretofore, the metal parts of electrical translating devices such as transformers, circuit breakers and the like have either been left bare or in some instances, merely covered with a material that provides electrical insulation. The copper or cuprous metal parts have been allowed to remain in contact with the oil as no harmful reaction between the metal and the oil in the presence of oxygen was known to have existed. It is known that copper acts as a carrier for oxygen and causes the oil to be broken down into organic acids, esters and other undersirable reaction products such as gums, tar, carbon and other sludge constituents.

My invention consists in providing the translating devices with a coating of another metal on the parts that are in contact with the oil. The metal used for coating the copper is such a metal as does not function as a carrier for combining the dissolved oxygen with the oil or a metal that is less energetic than copper as a carrier of oxygen.

I provide the metal parts of oil-filled translating devices with a coating of tin or with any metal which does not act as a carrier for oxygen. I have found that tin and zinc act less energetically toward the oil than do iron or copper. Copper acts most energetically as an oxygen carrier and when the copper is coated with the less active oxygen-carrying or non-catalytic metal, the formation of sludge and acid constituents is inhibited and the insulation properties of the oil as well as the other insulating materials are preserved.

For example, I coat all the copper parts of the device, which come in contact with the oil, preferably with tin. Insulation on some of the copper parts will protect the copper and in such cases only the exposed parts are coated. As the tin does not act catalytically to form organic acids and sludges in the customary oxidation process, I am able to maintain a high quality of oil for a long period of time.

Although I have described a specific embodiment of my invention, I do not wish to be limited thereto. I do not wish to be limited to any specific manner of coating the copper or to be limited to a coating of tin alone as an oxidizing inhibiting material as zinc is an efficient coating material and may be utilized in my invention. Other modifications of my invention will suggest themselves to those skilled in the art without departing from the spirit of my invention, the scope of which is defined in the annexed claims.

I claim as my invention:

1. In combination with an electrical translating device containing oil, said device having a cuprous metal submerged in said oil, of a coating of another metal on said cuprous metal, said coating comprising a metal which inhibits the formation of acids in said oil.

2. In combination with an electrical translating device containing oil, said device having copper submerged in said oil, of a coating of another metal on said copper, said coating comprising a metal which inhibits the formation of acids in said oil.

3. In combination with an electrical translating device containing oil, said device having copper submerged in said oil, of a coating of another metal on said copper, said coating comprising a metallic substance that is inert toward said oil as an oxygen carrier.

4. In combination with an electrical translating device containing oil, said device having cuprous metal submerged in said oil, of a coating of tin on said metal.

In testimony whereof, I have hereunto subscribed my name this 28th day of February, 1925.

CLARENCE J. RODMAN.